United States Patent [19]

Peddinghaus et al.

[11] 4,108,564
[45] Aug. 22, 1978

[54] DRILLING DEVICE WITH TOOL CARRIER SUPPORTED BY A CARRIAGE DISPLACEABLE IN DRILLING DIRECTION

[75] Inventors: Werner Peddinghaus, Sprockhovel; Ludwig Regenbrecht, Gevelsberg, both of Fed. Rep. of Germany

[73] Assignee: Werner Peddinghaus, Bruchhausen, Fed. Rep. of Germany

[21] Appl. No.: 777,696

[22] Filed: Mar. 15, 1977

Related U.S. Application Data

[63] Continuation of Ser. No. 611,645, Sep. 9, 1975, abandoned.

[30] Foreign Application Priority Data

Mar. 5, 1974 [DE] Fed. Rep. of Germany ....... 2410337

[51] Int. Cl.² .............................................. B23B 39/14
[52] U.S. Cl. ........................................ 408/10; 408/77
[58] Field of Search ...................... 408/10, 11, 12, 17, 408/77; 173/4, 19

[56] References Cited

U.S. PATENT DOCUMENTS

| | | | |
|---|---|---|---|
| 2,240,795 | 5/1941 | Morgan, Jr. et al. | 173/4 |
| 3,429,205 | 2/1969 | Jeanneret | 408/10 |
| 3,487,730 | 1/1970 | Dohring et al. | 408/10 |
| 3,734,202 | 5/1973 | Gyongyosi | 173/4 |

Primary Examiner—Horace M. Culver
Attorney, Agent, or Firm—Dressler, Goldsmith, Clement, Gordon & Shore, Ltd.

[57] ABSTRACT

A drilling device for workpieces of different sizes is disclosed herein. The drilling device includes a tool carrier supported by a carriage for reciprocable movement thereon along a path and the carriage is also reciprocable along the path. The carriage is biased to a predetermined starting position. When a tool on the tool carrier engages the workpiece, the carriage is moved in the opposite direction and engages a switch to reduce the feed speed of the tool carrier for a short period of time during which the carriage engages a stop to define a fixed drilling position. Upon completion of the drilling operation, a biasing spring moves the carriage in the drilling direction beyond the starting position to actuate a switch and return the tool carrier to a starting position while the carriage is also returned to the starting position.

20 Claims, 4 Drawing Figures

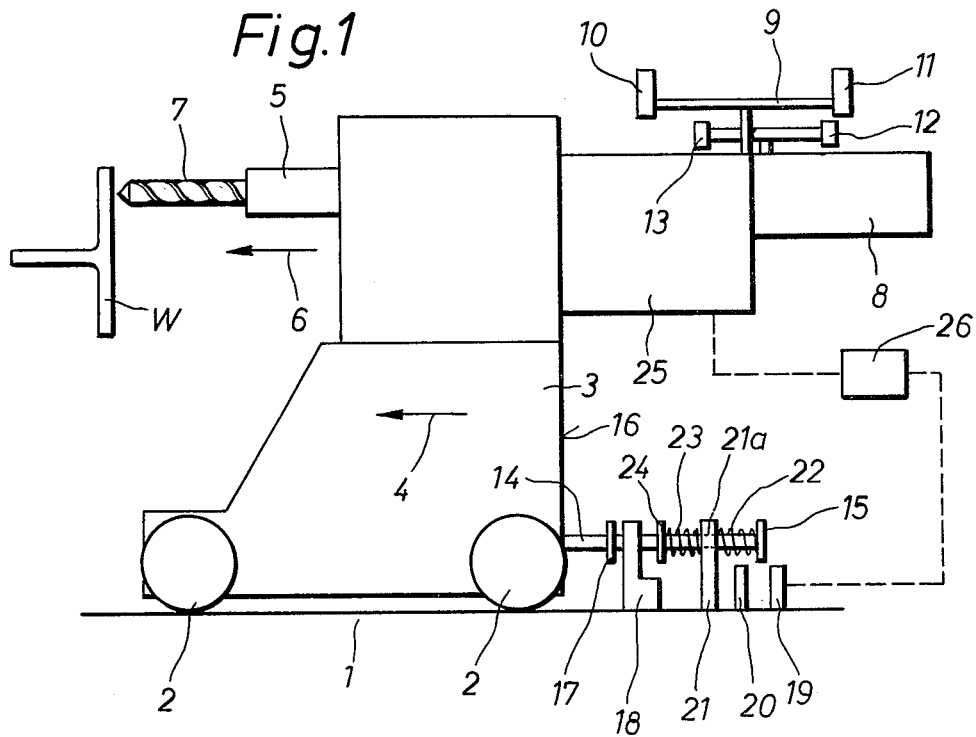
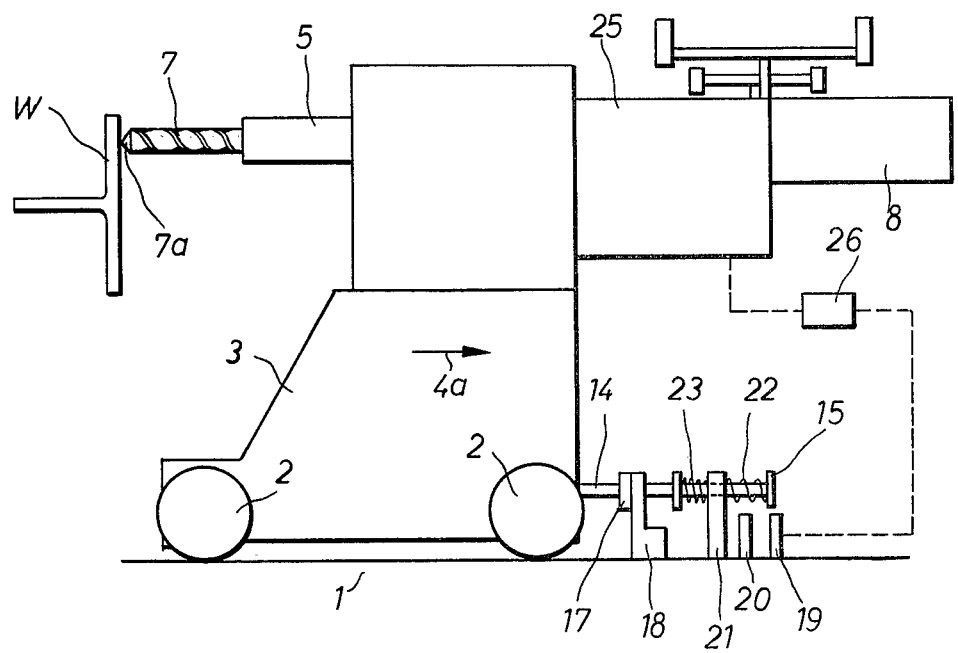

DRILLING DEVICE WITH TOOL CARRIER SUPPORTED BY A CARRIAGE DISPLACEABLE IN DRILLING DIRECTION

REFERENCE TO RELATED APPLICATIONS

This application is a continuation of application Ser. No. 611,645, filed Sept. 9, 1975, now abandoned.

BACKGROUND OF THE INVENTION

A feeding device for drilling tools with automatic reversal of the feeding speed has become known. With this known arrangement, the shifting over from fast traverse to working speed when the tool impacts upon the workpiece is effected in conformity with the increase of the torque or in conformity with the feeding pressure.

There has furthermore become known a deep hole drilling machine with control means controlling the changeover from "fast traverse forward" to "slow speed forward", according to which the tool carrier is, against the thrust of an axially effective spring, caused to engage an abutment of the displaceable tool carriage when the tool hits the workpiece. As control means in this connection there are employed an actuating cam which is coaxially arranged with the tool spindle, and furthermore a tool carriage cooperating with a limit switch cooperating with said actuating cam. Therefore, during the drilling operation, the tool carriage has to be adjusted with the tool carrier.

Furthermore, drilling devices have become known in which the drilling spindle is rotatable in a longitudinally displaceable spindle sleeve while the spindle sleeve is adapted through the intervention of complicated transmission means to be subjected to a faster and a lower rate of feed or advance.

The above mentioned devices have the drawback that either during the drilling operation, also the carriage has to be moved, or expensive transmissions have to be employed, or the duration of the fast traverse relative to the slow speed has to be adjusted in conformity with the distance of the spindle in its starting position from the workpiece of varying sizes. With horizontal drilling and milling machines and so-called machining centers, care is taken that the distance of the workpiece from the spindle in the starting position thereof is as constant as possible. This will be obtained by chucking the workpiece on the turntable of the boring mill or the machining center. With flights of drilling machines with which the device according to the invention may be employed, this aligning of the workpiece which in frequent instances represents a long profiled iron is not possible because the feeding roller bed of such flights determines the position of the workpiece which is held stationary.

SUMMARY OF THE INVENTION

The present invention relates to a drilling device for workpieces of different sizes which engage a stationary abutment which is perpendicular to the drilling direction. More specifically, the present invention relates to a drilling device of the above mentioned type which is provided with a tool carrier that is adjustable relative to a slide or carriage movable in the direction of drilling. The advancing movement of said slide or carriage, when the tool abuts the workpiece while overcoming a spring force, is changed by control contacts from "fast traverse or forward" to "slowly forward", while the carriage is equipped with at least one return spring for returning said carriage to its starting position and is furthermore provided with an extension which carries a control contact for changing the feeding speed.

It is, therefore, an object of the present invention to provide a drilling device of the above mentioned type in which during the drilling operation not only the workpiece carrier is to be moved but the time point of the shiftover from fast traverse of the drilling spindle to the slow movement thereof is effected automatically independently of the duration of the fast traverse movement and thus independently of the initial spacing between the drilling spindle and the workpiece. During the above mentioned drilling operation the tool carriage is arrested and thus does not require any drive. Whether the workpiece engaging the stationary abutment is large or small can be disregarded. The fast traverse of the spindle will always at a predetermined time be shifted over to the slow speed prior to the starting of the drilling operation proper.

The drilling device according to the present invention is characterized primarily in that the extension of the carriage for instance in the form of a rod, carries an abutment which prior to the start of the drilling operation engages a stationary counterbearing. The said abutment is so arranged that the control contact on the extension actuates its stationarily fixed counter contact for reducing the feeding speed of the tool carrier prior to the abutment hitting the counterbearing.

According to a further development of the invention, between the stationary contact and the feeding transmission of the tool carrier there is arranged a time relay which becomes effective after actuation of the counter contact. After said time relay has been disengaged, the feeding movement of the tool carrier is changed over to "drilling feed.". This step is necessary in particular with thin tools. It will be appreciated that if the drilling of such tool hits the workpiece, it appears appropriate not immediately to cause the drilling feed to its full extent to act upon the tool but instead to permit the drilling tip to enter the workpiece with a low feeding force and only thereafter to cause the tool to work at the "drilling feed" speed through the workpiece.

According to a further development of the invention, the stationary counter contact has associated therewith a second stationary counter contact which, following the completion of the drilling operation, turns off the transmission of the tool carrier or shifts the same to carry out its return stroke.

According to a still further development of the invention, the carriage or the feed piston of the tool carrier may include a contact limiting the return stroke of the tool carrier while a safety switch for the advance of the tool carrier is associated with said last mentioned contact. The advance or feed piston of the tool carrier preferably carries a contact which limits the drilling depths or the drilling feed or advance.

These and other objects and advantages of the invention will appear more clearly from the following specification in connection with the accompanying drawings, in which:

FIGS. 1 to 3 diagrammatically illustrate the drilling device according to the invention and its parts in various working positions.

FIG. 4 diagrammatically illustrates two workpieces of different sizes in engagement with a roller arranged perpendicularly with regard to the drilling device and also illustrates the different spacing of the drilling spindle in its starting position from the two differently sized workpieces.

DETAILED DESCRIPTION

Figure 3:
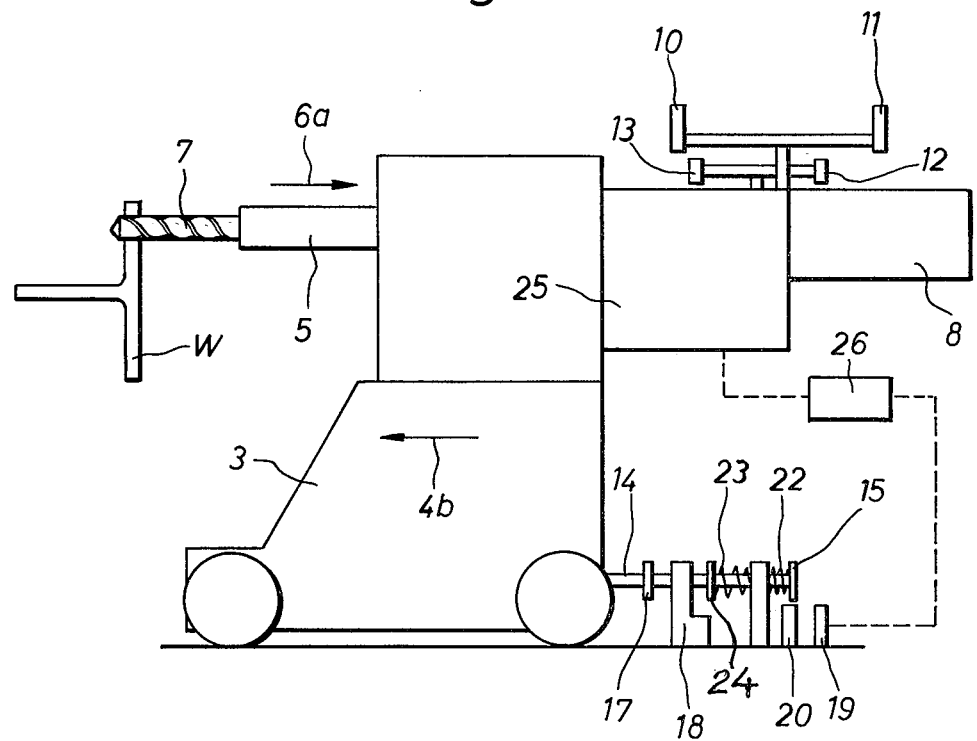

Referring now to the drawings in detail, the arrangement shown therein comprises a support or base 1 on which by means of wheels or rollers 2 a drilling carriage 3 is displaceable along a path in the direction of the arrow 4. The upper portion of the drilling carriage is provided with receiving means for the tool carrier 5 which is movable relative to carriage 3 by power operable means 25 likewise in the direction of the arrow 6 and which carries the drilling tool 7.

Above the feeding cylinder 8 there is provided a stationary holder 9 which may be considered as part of support 1. Holder 9 is equipped with two switches 10, 11. The feeding or advancing cylinder 8 of the tool carrier 5 is equipped with a rear contact emitter 12 and a front contact emitter 13 which are operatively connected to power operable means 25. Limit switches 10, 11 along with contact emitters 12, 13 define limit switch means for limiting the stroke of tool carrier 5 in the drilling direction as well as the return stroke in the opposite direction, as will be described later. The backside of the carriage 3 which faces away from the tool carrier 5 includes a fixed extension means in the form of a rod 14 which latter has one end thereof provided with a contact disc 15 fixedly connected thereto and in the vicinity of the wall 16 of the carriage 3 is provided with a further abutment disc 17 likewise fixedly connected to said rod 14. The rod 14 extends in the direction of movement of the drilling carriage 3 and of the tool carrier 5 and moves along the path for carriage 3. The abutment disc 17 cooperates with a stationary counterbearing 18, secured to support 1 to define stop means for carriage 3 whereas the contact disc 15 cooperates with two switches 19 and 20. Switches 19 and 20 are secured to support 1 and define first and second switch means connected to power operable means 25 and control actuation thereof as will be explained later.

On the rear section of rod 14 which extends freely through a bore 21a of a stationary bearing part 21, there are arranged two springs 22 and 23. The counterbearings of spring 22 are formed on one hand by the disc 15 connected to the rod 14 and on the other hand by the stationary bearing part 21. Spring 23 engages the bearing part 21 from the other side and rests against an additional disc 24 which is fixedly mounted on rod 14. Stated another way, discs 15 and 24 define first and second spaced abutment means on rod 14 with bearing part 21 defining a bearing means secured to support 1 intermediate abutment means 15, 24 and springs 22, 23 are respectively interposed between bearing means 21 and abutment means 15, 24. These elements cooperate to define biasing means which normally maintains carriage 3 in an intermediate predetermined position with respect to the path, as will be explained later.

The arrangement of the abutment disc 17 on rod 14 is, as will be explained further below, such that the disc 17 engages the counterbearing 18 after the disc 15 has actuated the switch 19. Between the switch 19 and power operable means 25 for tool carrier 5 there is preferably arranged a time relay or timing relay means 26.

OPERATION

The operation of the drilling device according to the invention is as follows:

In the starting position of the parts as shown in FIG. 1, the two springs 22, 23 are uniformly tensioned between their couterbearings 15, 21 and 24. The abutment disc 17 will occupy the position shown in FIG. 1, which means occupy a position spaced from the stationary counterbearing 18. If now the tool carrier 5 moves at fast traverse or fast speed from the position shown in FIG. 1 to the position shown in FIG. 2 while the tool 7 engages the workpiece W, the carriage 3 is displaced toward the right in the direction indicated by the arrow 4a which will compress spring 23. The contact discs 15 will in this connection slide onto the stationary switch 19 and cause the latter to convey a pulse to the time relay 26 as a result of which power operable means 25 of the tool carrier 5 turns off the high pressure hydraulic means and advances the tool carrier at a reduced speed prior to the abutment 17 engaging the counterbearing 18. The difference in stroke between the contact disc 15 and switch 19 on one hand and between the disc 17 and its counter-bearing 18 on the other hand may be kept very short while nevertheless the time relay 26 will not immediately cause the advance of the tool carrier 5 to shift again the drilling feet. Rather, the tool carrier 5 is due to the low pressure hydraulics in its cylinder 8 for the time being still held at its slow speed until the drill of the tool 7 has with its tip 7a adapted itself to the workpiece, in other words has drilled a short depression in the workpiece and abutment disc 17 engages counterbearing 18 to define a fixed drilling position for carrier 3. This is necessary particularly with drills of a short diameter in order to prevent the drill from breaking.

Thereupon the time relay 26 causes power operable means 25 of tool carrier 5 again to shift over to the feed or drilling speed so that at this speed the drill will penetrate the workpiece W.

Inasmuch as after the completed drilling of the workpiece W the resistance by means of which the spring 23 was tensioned no longer prevails, the spring 23 pushes the carriage 3 in the direction of the arrow 4b (in FIG. 3 toward the left) and more specifically beyond the initial starting or predetermined position of the carriage, in such a way that the contact disc 15 comes into contact with the second switch 20 so that the switch 20 will actuate power operable means 26 and initiate the return movement of the tool carrier 5 in the direction of the arrow 6a (FIG. 3). During the return movement of the tool 7 from the effected bore, the carriage 3 again moves to its starting or predetermined position.

The return movement of the tool carrier 5 in the direction of the arrow 6a can be braked by the switch 11 and the contact 12. Switch 11 and contact 13 are safety devices which become effective when the contact disc 15 on rod 14 does not come into action or when the drilling depths as for instance with blind holes, is to be limited. Advantageously, the switches 10, 11 or the contact emitters 12, 13 or both are adjustable in the longitudinal direction of the tool carrier.

The extension 14 is in its longitudinal direction adjustable and arrestable on the carriage 3. In other words, the counterbearing 15, 18, 21 and 24 of the abutment 17 and the contacts 19, 20 are adjustable and arrestable.

These adjustments can be made by means well known in the art. For example, switches 10 and 11, could be movable on holder 9 and held in adjusted positions by set screws (not shown). Also, rod 14 could be located in a threaded opening in carriage 3 to be adjustable and abutments 15 and 17 could be adjustable in the same fashion.

Figure 4:
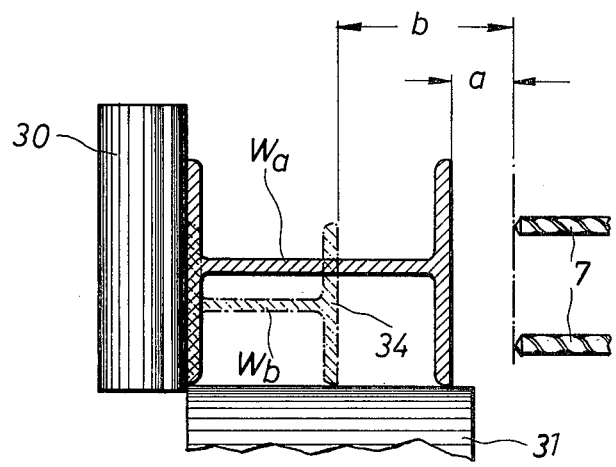

FIG. 4 shows the function of the device to realize the objects mentioned above. The lateral roller 30 of a roller bed forms the stationary abutment for the two workpieces W$a$ and W$b$ which are of different sizes and which rest against the horizontal roller 31. The stationary abutment for the two workpieces W$a$ and W$b$ extends in a direction perpendicular to the drilling direction. The flange 33 of the workpiece W$a$ which flange has to be drilled through, is spaced by a distance $a$ from the drilling spindle 7 in the starting position of the latter, whereas the flange 34 of the workpiece W$b$ to be drilled is spaced by the distance $b$ from the spindle 7. With this device according to the present invention, the spindle 7 will without previous control or switching movements automatically always at fast traverse speed perform the stroke $a,b$ independently of the size of the respective stroke. Only thereafter, the parts 15 and 16 will shift the device automatically to slow speed. After the slow speed for spindle 7 has been made effective, also the carriage 3 will move at low speed and thus permits the abutment 17 also only slowly to engage the counterbearing 18 so that breakage of the tool will for all practical purposes be avoided.

It is, of course, to be understood that the present invention is, by no means, limited to the specific showing in the drawings but also comprises any modifications within the scope of the appended claims.

What we claim is:

1. A drilling device for workpieces of different sizes, which includes: a support, a carriage reciprocable on said support in the drilling direction of said drilling device, a tool carrier adapted to receive a drilling tool and supported by said carriage and movable on said carriage, variable speed power operable means between said carriage and said tool carrier for causing the latter to feed said drilling tool carrier thereby toward and through a workpiece, said carriage including an extension movable therewith, a switching element secured to said extension so as to be movable therewith, a first switch on said support connected to said power operable means and located in the path of said switching element for actuation of said first switch by said switching element, an abutting element connected to said extension in spaced relationship to said switching element, first stationary bearing means on said support located on that side of said abutting element which faces towards said switching element, said first stationary bearing means being spaced from said abutting element by a distance slightly greater than the distance by which in said switching element is spaced from said first switch when said drilling device is in a non-drilling position, and means associated with said tool carrier and said carriage and operable in response to said tool carrier having moved in a first direction into contact with a workpiece mounted to be drilled to move said carriage in a second direction opposite to said first direction by a distance to cause said switch element to close said first switch to thereby bring about a reduction in the speed of said power operable means and thereby said tool carrier in the direction toward the workpiece to be drilled.

2. A drilling device according to claim 1, which includes timing relay means electrically connected to and interposed between said first switch and said power operable means and being operable in response to the actuation of said first switch by said switch element to first reduce the feeding speed of said power operable means and thereby the advancing speed of said tool carrier and a short time thereafter corresponding to a desired time delay set in said timing relay means to again increase the speed of said power operable means and thereby the advancing speed of said tool carrier.

3. A drilling device according to claim 1, which includes second bearing means on said support and having a passage therethrough for slidingly supporting said extension, first spring means arranged on one side of said second bearing means between the latter and said switch element, abutment means connected to said extension and arranged on the other side of said second bearing means and in spaced relationship thereto, and second spring means substantially identical to said first spring means and interposed between said second bearing means and said abutment means with said first and second spring means being uniformly tensioned between said second bearing means and said switching element and said abutment means, respectively in the starting position of said carriage.

4. A drilling device according to claim 1, which includes a second switch on said support and connected to said power operable means, said second switch being operable at the end of the respective drilling operation to be actuated by said switch element for causing the latter to reverse the advancing movement of said tool carrier and returning said carriage to its starting position.

5. A drilling device according to claim 3, in which during the movement of said carriage in said second direction during a drilling operation said second spring means is loaded and in response to the cessation of the drilling resistance at the end of the drilling operation moves said switch element into engagement with said second switch.

6. A drilling device according to claim 1, which includes limit switch means operatively connected to said tool carrier and said power operable means for limiting the stroke of said tool carrier in the drilling direction and the return stroke of said tool carrier.

7. A drilling device according to claim 1, which includes a limit switch connected to said power operable means for limiting the stroke of said tool carrier in the drilling direction.

8. A drilling device according to claim 1, in which said extension and said stationary bearing means are adjustable relative to said carriage.

9. A drilling device according to claim 4, in which said first and second switches are adjustable relative to said carriage.

10. A drilling device according to claim 3, in which said bearing means is adjustable relative to said carriage.

11. A drilling device for workpieces of different sizes comprising: a support, a carriage reciprocable along a path on said support, a tool carrier reciprocable on said carriage along said path and adapted to receive a drilling tool, variable speed power operable means interposed between said carriage and said tool carrier for moving said tool carrier along said path, said power operable means normally moving said tool carrier in a drilling direction at a traverse speed and adapted to operate at a reduced speed below said traverse speed, extension means fixed to said carriage and movable along said path with said carriage, biasing means normally maintaining said carriage in a predetermined position relative to said support and accommodating movement in opposite directions along said path, switch means secured to said support and located in the path of said extension means, said switch means being connected to said power operable means, and stop means in the path of said extension means defining an extreme position for said carriage in an opposite direction to said drilling direction so that said carriage is moved in the opposite direction upon contact with a workpiece to actuate said switch means and said power operable means thereby operating said power operable means at a reduced speed, said extension means subsequently engaging said stop means to thereby define a fixed drilling position for said carriage.

12. A drilling device according to claim 11, which includes timing relay means electrically connected to and interposed between said switch means and said power operable means and being operable in response to the actuation of said switch means to first reduce the speed of said power operable means and thereby the advancing speed of said tool carrier and a short time thereafter corresponding to a desired time delay set in said timing relay means to increase the speed of said power operable means to a drilling speed.

13. A drilling device according to claim 11, in which said biasing means moves said carriage in said drilling direction beyond said predetermined position upon completion of a drilling operation and further including second switch means in the path of said extension means and connected to said power operable means for reversing said tool carrier upon completion of a drilling operation and said biasing means returns said carriage to said predetermined position.

14. A drilling device according to claim 13, in which said extension means includes a rod extending from said carriage, said rod having a switching element secured thereto for actuating both switch means.

15. A drilling device according to claim 14, in which said biasing means includes first and second spaced abutment means secured to said rod, bearing means secured to said support and interposed between said first and second spaced abutment means.

16. A drilling device according to claim 14, in which said stop means includes a disc fixed to said rod and a stationary counterbearing fixed to said support and located in the path of said disc.

17. A drilling device according to claim 13, further including limit switch means adjacent said tool carrier and connected to said power operable means for limiting the stroke of said tool carrier in the drilling direction and the opposite direction.

18. A drilling device according to claim 17, in which said limit switch means includes first and second spaced limit switches fixed adjacent said power operable means and contact emitter means carried by said power operable means for actuating said limit switches.

19. A drilling device according to claim 18, in which one of said contact emitter means and said first and second limit switches are adjustable with respect to the other of said contact emitter means and said first and second limit switches to vary the stroke of said tool carrier.

20. A drilling device according to claim 15, in which said rod is adjustable on said carriage and said bearing means is adjustable on said support to change said predetermined position.

* * * * *